INVENTORS
HUGH D. MAC DONALD Jr.
LEONARD A. DE STEFANO
JAMES M. DE LEO

BY
ATTORNEYS

INVENTORS
HUGH D. MAC DONALD JR.
LEONARD A. DE STEFANO
JAMES M. DE LEO

BY *Harry M. Saragovitz,*
*Edward J. Kelly, Herbert Berl*
*& S. Dubroff*

ATTORNEYS

United States Patent Office 3,421,720
Patented Jan. 14, 1969

3,421,720
AIRCRAFT SEAT EJECTION SYSTEM
Hugh D. MacDonald, Jr., Cinnaminson, and Leonard A. De Stefano, Pennsauken, N.J., and James M. De Leo, Washington, D.C., assignors to the United States of America as represented by the Secretary of the Army
Filed May 27, 1966, Ser. No. 554,646
U.S. Cl. 244—122     3 Claims
Int. Cl. B64d 25/10

ABSTRACT OF THE DISCLOSURE

An aircraft seat ejection system having a seat with a predetermined man-seat center of gravity, and a main rocket for elevating the seat for parachute deployment. The system includes auxiliary, low impulse vernier rocket means on the seat and responsive to angular displacement of the seat to provide a promptly effective flight attitude correction to the ejected seat.

---

The invention described herein may be manufactured and used by or for the Government for governmental purposes without the payment to us of any royalty thereon.

This invention relates to an aircraft seat ejection system and, more particularly, to such a system having a main rocket thrust to eject and elevate the man-seat apparatus to sufficient altitude for parachute deployment.

Preferably, the thrust of a main rocket or rocket portion of an injection rocket-catapult is directed through a predetermined center of gravity for the man-seat apparatus. Upon ejection of the man-seat apparatus, it is immediately subjected to certain forces such as aerodynamic force, rail reaction tip-off force, and possible misalignment of the center gravity, and as a result the man-seat apparatus has a tendency to pitch, adversely affecting the desired flight stability of the ejected apparatus.

It is an object of the invention to provide a seat ejection arrangement having deviation correction means for counterbalancing its propsective flight instability and possible misorientation.

Another object of the invention is to provide such an arrangement that will enable the ejected seat to enjoy maximum air time to assure safe parachute deployment.

A further object of the invention is to provide such an arrangement that will enable the parachute apparatus to be rendered effective in a minimum period of time after deployment thereof.

In one aspect of the invention an aircraft seat ejection system has a seat with a predetermined man-seat center of gravity, a main rocket for delivering sufficient thrust to the seat through the center of gravity for elevating the seat to enable safe parachute deployment, and auxiliary, low impulse venier rocket means on the seat for providing selected moments of force to the seat on either side of the center of gravity.

These and other objects, features and advantages will become apparent from the following description and accompanying drawings in which.

Figure 1:
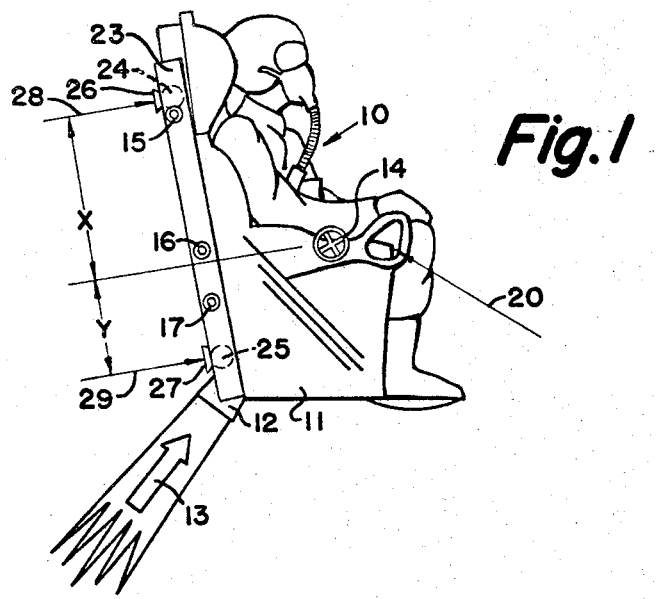
FIG. 1 is an elevational view of a man-seat apparatus in flight upon ejection from an aircraft and embodying the principles of the invention.
Figure 2:
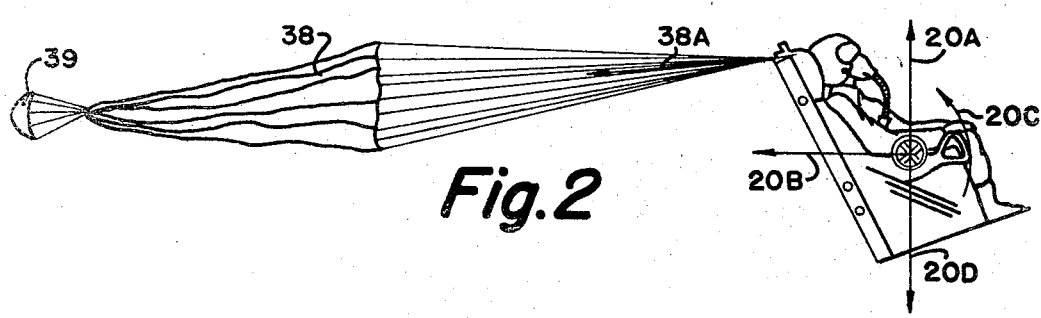
FIG. 2 is a view similar to FIG. 1 with the parachute equipment having been deployed as soon as aerodynamically and physiologically possible during the ejected man-seat flight.
Figure 3:
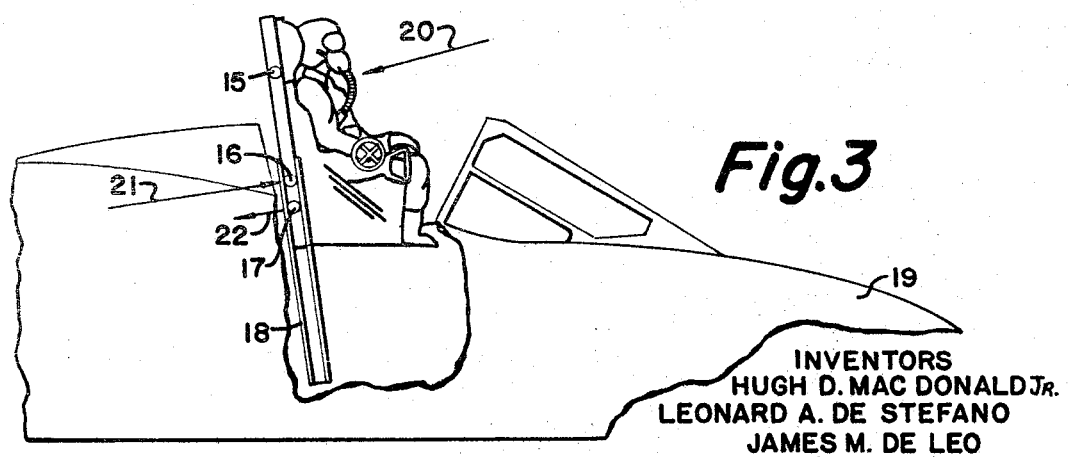
FIG. 3 is a view similar to FIG. 1 with the man-seat apparatus in the process of leaving the aircraft.

The man-seat apparatus, shown generally at 10 (FIG. 1), of the aircraft seat ejection system, includes a seat structure 11 having a rearward portion to which are appropriately secured or mounted a main rocket whose exit nozzle 12 is preferably directed in such a manner to provide a main thrust 13 in the direction of a predetermined man-seat center of gravity 14, and roller wheels or the like 15, 16, 17 which are guided by suitable track means 18 (FIG. 3) during the initial or catapult phase of seat ejection from the aircraft 19. As the roller means 16, 17 leave the track or rail means 18, the ejected man-seat apparatus is immediately subjected to a variety of forces, accompanying main rocket thrust 13, that tend to pitch the ejected apparatus and thus adversely affect its desired flight stability. Primarily the subjecting or environmental forces include an aerodynamic force 20, a tip-off force created by rail reaction forces 21 and 22 (FIG. 3), and possibly a center of gravity misalignment due to the occupant being moved to a slumping position. The force 20 (FIG. 1) is broken down into its components of lift 20A (FIG. 2), drag 20B, moment 20C, and weight 20D.

A plurality of auxiliary, low impulse vernier rockets 24, 25 are suitably secured to the back frame 23 of seat 11 such that their exit nozzles 26, 27 are directed in parallelism to each other with the capacity to provide predetermined forces 28, 29 to the apparatus at respective opposed moment arms X, Y relative to the apparatus center of gravity 14. Should be apparatus begin to pitch counteclockwise as viewed in FIG. 1 vernier rocket means 24 is initiated to counterbalance the prospective flight instability and possible misorientation. Similarly, vernier rocket means 25 provides a deviation correction means for pitch in the opposite or clockwise direction. Each vernier rocket means has a predetermined propellant charge and associated initiator. However, a plurality of such charge and initiator means may be provided to enable selectivity of the desired amount of promptly effective corrective thrust.

It should be apparent to those skilled in the art that the foregoing principles of attitude correction and trajectory optimization are equally available to counterbalance deviations in three as well as two dimensional space.

Figure 4:
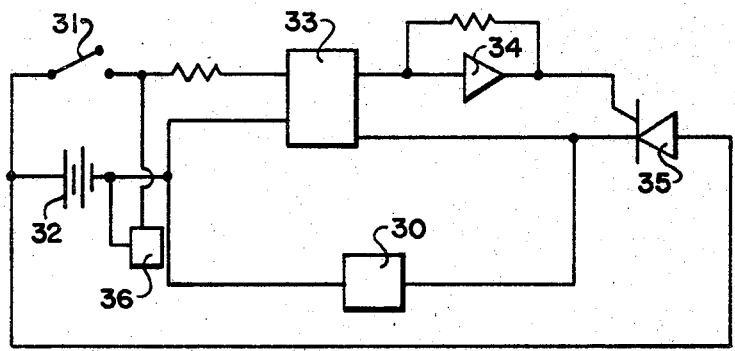
FIG. 4 is a wiring diagram of a control circuit for initiating auxiliary rocket means for correcting deviations from a desired flight attitude of the ejected apparatus.

As shown in the electrical control circuit diagram of FIG. 4, there being a separate circuit for each vernier rocket initiator 30, a switch 31 is automatically closed upon seat ejection from the aircraft to allow current to flow from power source 32 to an accelerometer 33 which sends a signal, representing the angular acceleration of the seat in a pitch situation, to amplifier 34 by which the output signal is strengthened to actuate or trip a switching transistor or rectifier 35, thus completing the circuit containing the immediately fired initiator 30. The circuit also contains a delayed circuit breaker 36 which opens a predetermined period of time after closing of switch 31 to render ineffective or unarm any unfired initiator 30 in the circuit prior to appearance of force 38A developed by development of the parachute apparatus 38 (FIG. 2), whose drogue chute is shown at 39. By virtue of the controlled or corrective vernier impulses to the ejected seat apparatus the latter will follow a desirable flight attitude to enable safe parachute deployment. At the time of parachute deployment (FIG. 2) the man-seat apparatus will have attained such an attitude and velocity as to orient the direction of parachute deployment same in sense and substantially parallel to the aerodynamic force upon the parachute apparatus so that said parachute apparatus may be inflated in a minimum amount of time.

Figure 5:
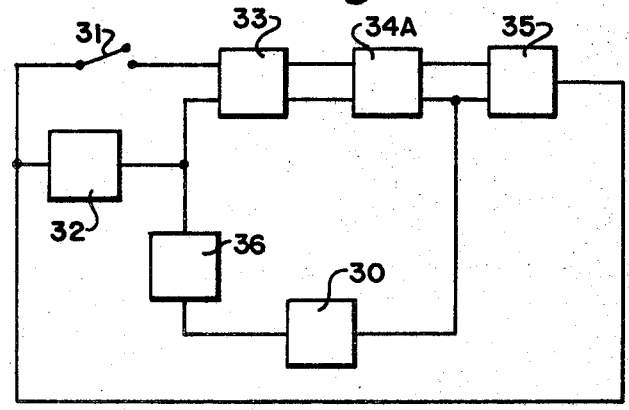
FIGS. 5 and 6 are modified wiring diagrams of control circuits similar to that shown in FIG. 4.

In the modified circuit of FIG. 5 a combination amplifier and integrator 34A sends an output angular velocity signal to the switching transistor 35 for completing the circuit to fire initiator means 30.

Figure 6:
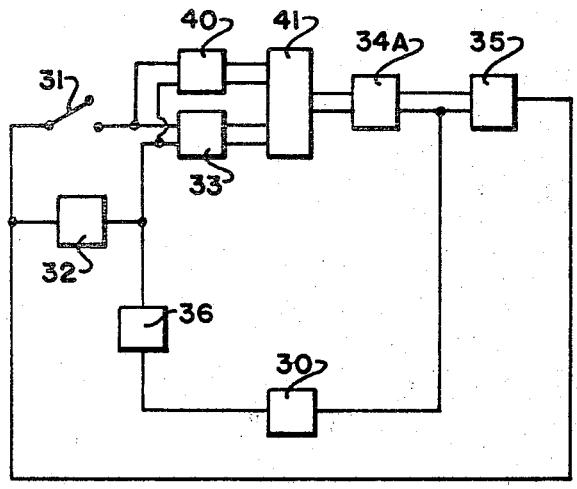

In the modified circuit of FIG. 6 a gyroscope 40 or position sensitive device calibrated to the earth's horizon sends a signal of pitch position relative to the horizon, and a summer 41 adds or sums the signals of the accelerometer 33 and gyroscope 40 and sends the sum to the combined amplifier and integrator 34A.

We claim:

1. In an aircraft seat ejection system having a seat with a predetermined man-seat center of gravity, and a main rocket for delivering sufficient thrust to said seat through said center of gravity for elevating said seat to a predetermined elevation to enable safe parachute deployment, a plurality of auxiliary, low impulse vernier rocket means on said seat for providing selective corrective moments to said seat about the center of gravity so constructed and arranged that in response to deviations from a desired ejected seat flight attitude, initiation of selected ones of said vernier rocket means will provide a promptly effective flight attitude correction to said ejected seat, each of said vernier rocket means having an initiator connected in an electrical circuit, each circuit including an energizing switch that is closed when said seat is ejected, an accelerometer responsive to angular acceleration of said seat, an amplifier for strengthening an output signal from said accelerometer, a switching transistor responsive to an amplified signal corresponding to one of said deviations actuating the respective initiator circuit, and a delayed circuit breaker to unarm the corresponding initiator a predetermined period after switch energization.

2. The structure in accordance with claim 1 in which each amplifier includes an integrator.

3. The structure of claim 2 wherein each circuit includes a gyroscope, and a summer for summing the signals of the corresponding accelerometer and gyroscope.

References Cited

UNITED STATES PATENTS 3,270,991  9/1966  Martin _____ 244—122

MILTON BUCHLER, *Primary Examiner.*

R. A. DORNON, *Assistant Examiner.*